United States Patent
Ohtsuki

(10) Patent No.: US 7,866,893 B2
(45) Date of Patent: Jan. 11, 2011

(54) BEARING APPARATUS FOR A WHEEL OF VEHICLE

(75) Inventor: Hisashi Ohtsuki, Iwata (JP)

(73) Assignee: NTN Corporation (JP)

( * ) Notice: Subject to any disclaimer, the term of this patent is extended or adjusted under 35 U.S.C. 154(b) by 635 days.

(21) Appl. No.: 11/792,012

(22) PCT Filed: Nov. 9, 2005

(86) PCT No.: PCT/JP2005/020521

§ 371 (c)(1), (2), (4) Date: Jan. 23, 2008

(87) PCT Pub. No.: WO2006/059467

PCT Pub. Date: Jun. 8, 2006

(65) Prior Publication Data

US 2008/0310784 A1 Dec. 18, 2008

(30) Foreign Application Priority Data

Dec. 2, 2004 (JP) ............................. 2004-350178

(51) Int. Cl.
*F16C 13/00* (2006.01)
*F16C 19/02* (2006.01)
(52) U.S. Cl. .................... 384/544; 384/589; 384/543
(58) Field of Classification Search .............. 384/489, 384/513, 537, 543–544, 569, 589
See application file for complete search history.

(56) References Cited

U.S. PATENT DOCUMENTS

| 4,887,917 | A | * | 12/1989 | Troster et al. | ............... | 384/543 |
| 6,135,571 | A | * | 10/2000 | Mizukoshi et al. | .......... | 384/544 |
| 6,280,096 | B1 | | 8/2001 | Miyazaki et al. | | |
| 6,286,909 | B1 | * | 9/2001 | Mizukoshi et al. | .......... | 384/544 |
| 6,497,515 | B1 | | 12/2002 | Sahashi et al. | | |
| 6,574,865 | B2 | * | 6/2003 | Meeker et al. | ............... | 384/544 |
| 6,712,707 | B2 | * | 3/2004 | Ogura et al. | ................. | 384/589 |
| 6,739,977 | B2 | * | 5/2004 | Tajima et al. | ................ | 464/178 |
| 2005/0141799 | A1 | | 6/2005 | Uyama et al. | | |

FOREIGN PATENT DOCUMENTS

| DE | 10029100 A1 | 3/2001 |
| DE | 69819217 T2 | 8/2004 |
| EP | 0854303 A2 | 7/1998 |

(Continued)

*Primary Examiner*—Marcus Charles
(74) *Attorney, Agent, or Firm*—Harness, Dickey & Pierce, P.L.C.

(57) ABSTRACT

A vehicle wheel bearing apparatus has an outer member (10), an inner member (1) and double row rolling elements (6, 6) freely rollably arranged between the outer and inner raceway surfaces (10*a*, 10*a;* 2*a*, 3*a*), respectively, of the outer and inner members (10 and 1), via cages (7). An annular projection (12) is formed on the outer circumferential surface at an inboard side end of the cylindrical portion (2*b*) of the wheel hub (2). An annular recess (13) is formed on the inner circumferential surface at the inboard side end of the inner ring (3). The annular recess (13) corresponds to the annular projection (12) and has a difference in height slightly larger than that of the annular projection (12). The inner ring (3) is press fit onto the cylindrical portion (2*b*) of the wheel hub (2) with the recess (13) engaged by the projection (12).

11 Claims, 5 Drawing Sheets

FOREIGN PATENT DOCUMENTS

| | | | |
|---|---|---|---|
| EP | 1541377 A1 | 6/2005 |
| FR | 2795021 A1 | 12/2000 |
| JP | 9-164803 A | 6/1997 |
| JP | 2001-1710 A | 1/2001 |
| JP | 2002114005 A * | 4/2002 |
| JP | 2004-169927 A | 6/2004 |
| JP | 2004-232669 A | 8/2004 |
| JP | 2004-306692 A | 11/2004 |
| JP | 2004-338584 A | 12/2004 |
| WO | 2004/007219 A1 | 1/2004 |

* cited by examiner (a)

(b)

Prior Art

Prior Art

Prior Art

BEARING APPARATUS FOR A WHEEL OF VEHICLE

CROSS-REFERENCE TO RELATED APPLICATIONS

This application is a National Stage of International Application No. PCT/JP2005/020521, filed Nov. 9, 2005, which claims priority to Japanese Patent Application No. 2004-350178, filed Dec. 2, 2004. The disclosures of the above applications are incorporated herein by reference.

FIELD

The present invention relates to a vehicle wheel bearing apparatus to support a driven wheel of a vehicle, such as an automobile, rotatably relative to its suspension apparatus and, more particularly, to a vehicle wheel bearing apparatus intended to reduce its weight and size as well as to suppress displacement of an inner ring press fit onto a wheel hub prior to an assembly of a constant velocity universal joint onto the bearing apparatus.

BACKGROUND

There are two types of bearing apparatus of a vehicle, one for a driving wheel and one for a driven wheel. Especially in the vehicle bearing apparatus that rotatably supports a wheel relative to a suspension apparatus, it is required not only that it be made at a low cost but additionally it must be light weight and have a small size to improve fuel consumption. A representative example of a prior art bearing apparatus for a vehicle driving wheel is shown in FIG. 4.

FIG. 4 illustrates a vehicle wheel bearing apparatus of third generation type having an inner member 53 with a wheel hub 51 and an inner ring 52. An outer member 54 is press fit onto the inner member 53. Double row rolling elements 55 and 55 are arranged between the outer and inner members 54 and 53. The wheel hub 51 is integrally formed at one end with a wheel mounting flange 56 to mount a vehicle wheel (not shown). Also, the wheel hub 51 has an inner raceway surface 51a on its outer circumferential surface. A cylindrical portion 51b axially extends from the inner raceway surface 51a. A serration 51c is formed on its inner circumferential surface. Hub bolts 56a, for securing the wheel, are arranged via an equidistant space along the circumference of the wheel mounting flange 56. The inner ring 52, including an inner raceway surface 52a formed on its outer surface, is press fit onto the cylindrical portion 51b of the wheel hub 51.

The outer member 54 is integrally formed with a body mounting flange 54b. The outer member 54 also has double row outer raceway surfaces 54a and 54a on its inner circumferential surface. Double row rolling elements 55 and 55 are freely rollably arranged between the double row outer raceway surfaces 54a and 54a and the opposed inner raceway surfaces 51 a and 52a.

An outer joint member 58, forming a part of a constant velocity universal joint 57, is integrally formed with a stem portion 60 that axially extends from the shoulder portion 59 of the outer joint member 58. A serration 60a is on the stem outer circumferential surface to engage the serration 51c of the wheel hub 51. An outer thread 60b is on its tip end. The outer joint member 58 is fit into the wheel hub 51 until its shoulder portion 59 abuts the inner ring 52. Accordingly, the outer joint member 58 and wheel hub 51 are separably united by fastening a nut 61 on the outer thread 60b.

In such a vehicle wheel bearing apparatus, the bearing is usually set at a negative gap in order to increase the rigidity of the bearing apparatus and to improve the durability of the bearing portion. In this case the bearing pre-load is controlled by setting the fastening torque of the nut 61 at a predetermined value. However, since the inner ring 52 is mounted on the wheel hub 51 simply by press fitting, the inner ring 52 is liable to be axially displaced on the wheel hub 51 by external forces such as vibration or rotation during transportation and/or assembling operation before the bearing apparatus is assembled to the constant velocity universal joint. Thus, the initially set pre-load is lost and accordingly rattling would occur within the bearing.

If the inner ring 52 is displaced and rattling occurs in the bearing, a lip 63a of an inboard side seal 63 is dropped off from the sliding surface (outer circumferential surface of the inner ring 52) as shown in FIG. 5(b). Under such a condition, if the nut 61 is fastened with a predetermined fastening torque during assembly of the constant velocity universal joint, although the inner ring 52 is returned to its original position, the lip 63a is overturned or pinched between the inner raceway surface 52a and the rolling element 55 and is thus damaged or severed. (FIG. 5(c)). This extremely reduces the sealability of the lip 63a and reduces the life of the bearing due to ingress of muddy water into the bearing which causes seizure of the bearing due to the outflow of lubricating grease from the bearing.

A vehicle wheel bearing apparatus that can solve such a problem of preventing the displacement of the inner ring has been developed as shown in FIG. 6. According to the bearing apparatus of FIG. 6, the axial displacement of an inner ring 62 or its dropping off from a wheel hub 51' is prevented by a caulked portion 51d formed by plastically deforming an end of a cylindrical portion 51b of the wheel hub 51'. This kind of structure is called a "self-retaining type" and has a feature that can prevent the loss of the pre-load for a long term. Structural elements of the bearing apparatus of FIG. 6 are the same as those of the bearing apparatus of FIG. 4 and are designated by same reference numerals. Repeating of their description will thus be omitted.

In addition, in the vehicle wheel bearing apparatus of FIG. 6, an annular recess 62a is formed at the inboard side end face of the inner ring 62 within which the caulked portion 51d is contained. The hardened projecting end of the inner ring 62 abuts a shoulder portion 59 of an outer joint member 58. Accordingly, since the non-hardened caulked portion 51d does not abut the shoulder portion 59 of the outer joint member 58, it is possible to prevent wear of the caulked portion 51d (see Japanese Laid-open Patent Publication No. 164803/1997).

However in such a vehicle wheel bearing apparatus of FIG. 6, it is difficult to form the caulked portion 51d by plastically deforming (swing caulking) the end of the cylindrical portion 51b radially outward because of interference of the projected end of the annular recess 62a of the inner ring 62 against a caulking tool (not shown). In addition, since it is impossible to restrain the radially outer end of the caulked portion 51d by the caulking tool, the caulking operation has to be carried out by plastically deforming the end of the cylindrical portion 51b of the wheel hub 51' only in the axial direction. Accordingly, a region of the cylindrical portion 51b near the caulked portion 51d is also deformed radially outward. Thus, the inner ring 62 is also expanded radially outward and this causes a large hoop stress in the inner ring 62.

The generation of a large hoop stress in the inner ring 62 exerts an extremely bad influence on the strength and durability of the inner ring 62. In order to deal with this problem, the amount of plastic deformation of a portion of the inner ring 62 is suppressed where the cylindrical portion 51b of the wheel hub 51' is fitted during the swing caulking operation. However it is necessary to strictly care for the dispersion of hardness of base metal of the wheel hub 51' or dispersion of the hardened layers, hardened by high frequency induction hardening, in their axial directions at the end of the cylindrical portion 51b. This causes an increase in the manufacturing cost of the bearing apparatus. Thus, a commonly adopted way to reduce the generated hoop stress in the inner ring is to increase the thickness of the inner ring 62. This adds both to weight and cost.

SUMMARY

It is, therefore, an object of the present disclosure to provide a vehicle wheel bearing apparatus that can reduce its weight and size as well as suppress displacement of an inner ring press fit onto a wheel hub prior to an assembly of a constant velocity universal joint to the bearing apparatus.

According to the present disclosure, a vehicle wheel bearing apparatus comprises an outer member formed with double row outer raceway surfaces on its inner circumferential surface. An inner member includes a wheel hub and an inner ring. The wheel hub has a wheel mounting flange integrally formed at one end and a cylindrical portion axially extending from the wheel mounting flange. The cylindrical portion is formed with a serration on its inner circumferential surface. One of the inner raceway surfaces is formed on the outer circumferential surface of the cylindrical portion The inner ring is press fit onto the cylindrical portion of the wheel hub. The inner ring is formed with the other of inner raceway surfaces. Double row inner raceway surfaces are arranged opposite to the double row outer raceway surfaces. Double row rolling elements are freely rollably arranged between the outer and inner raceway surfaces, respectively, of the outer and inner members, via cages. An outer joint member, forming a portion of a constant velocity universal joint, is integrally formed with a shoulder portion that is adapted to abut the end face of the inner ring. A stem portion axially extends from the shoulder portion. The stem is adapted to be inserted in the wheel hub via a serration engagement. The wheel hub and the outer joint member are removably connected with each other. An annular projection is formed on the outer circumferential surface at an inboard side end of the cylindrical portion of the wheel hub. An annular recess is formed on the inner circumferential surface at the inboard side end of the inner ring. The annular recess corresponds to the annular projection and has a difference in height slightly larger than that of the annular projection. The inner ring is press fit onto the cylindrical portion of the wheel hub with the recess engaged by the projection. An outboard side end surface of the inner ring abuts a shoulder portion on the cylindrical portion of the wheel hub. The inboard side end surface of the inner ring projects toward the inboard side from the inboard side end face of the cylindrical portion of the wheel hub.

The annular projection is formed on the outer circumferential surface at an inboard side end of the cylindrical portion of the wheel hub. The annular recess is formed on the inner circumferential surface at the inboard side end of the inner ring. The annular recess corresponds to the annular projection and has a difference in height slightly larger than that of the annular projection The inner ring is press fit onto the cylindrical portion of the wheel hub with the recess engaged by the projection. An outboard side end surface of the inner ring abuts a shoulder portion on the cylindrical portion of the wheel hub. The inboard side end surface of the inner ring projects toward the inboard side from the inboard side end face of the cylindrical portion of the wheel hub. Displacement of the inner ring, which is caused during transportation of the bearing apparatus or assembly of the bearing apparatus to the constant velocity universal joint, is prevented by the annular projection of the wheel hub. Accordingly, pinching of the inboard side seal between the inner raceway surface and the rolling element is also prevented. In addition, since the slightly displaced inner ring can be moved axially while being fastened by the nut after the constant velocity universal joint has been assembled to the bearing apparatus and the outboard side end face abuts the shoulder portion of the wheel hub, the predetermined initial pre-load of the bearing can be maintained. Furthermore, since the inboard side end surface of the inner ring projects toward the inboard side from the inboard side end face of the cylindrical portion of the wheel hub, a sufficiently larger abutting area between the inner ring and the shoulder portion of the outer joint member is obtained. Accordingly, wear and the generation of noise are also reduced due to a reduction of the bearing pressure between them. Accordingly, it is possible to provide a vehicle wheel bearing apparatus that has a light weight and a small size that can prevent slipping out of the inner ring from the wheel hub as well as the generation of a large hoop stress in the inner ring.

Ordinarily, the wheel hub is made of medium carbon steel including carbon of 0.40~0.80% by weight. One of inner raceway surfaces is formed directly on its outer circumferential surface. The area, ranging from the inner raceway surface to the cylindrical portion is hardened, by high frequency induction hardening, to have a surface hardness of 58~64 HRC. The inner ring is made of high carbon chrome bearing steel. It is hardened to its core by dip quenching to have a surface hardness of 58~64 HRC. The annular projection and the annular recess are formed by a cutting process. These features enable dimensional accuracy of the annular projection and recess to be kept within a predetermined range and to prevent generation of plastic deformation in the inner ring by press fitting.

The inner ring is press onto the cylindrical portion of the wheel hub via an interference of 10~50 μm. The annular projection is formed with a height difference of 60~120 μm in its diameter relative to the outer circumferential surface of the cylindrical portion of the wheel hub. These features enables for the inner ring to get over the annular projection and press fit onto the cylindrical portion of the wheel hub, via elastic deformation, without causing severe stress. Also, this enables axial securement, via engagement of the projection and the recess, after it is fit onto the cylindrical portion of the wheel hub.

The stem portion of the outer joint member is fit onto the inner circumferential surface of the wheel hub, via a predetermined radial gap. This makes it possible to support the wheel hub by the stem portion, via a cylindrical engagement between the two, and thus to increase the rigidity of the wheel hub.

An axial gap is between the annular projection and the annular recess in a condition where the outboard side end face of the inner ring abuts the shoulder portion on the cylindrical portion of the wheel hub. The axial gap is set to be less than an amount of the projection of the inboard side end face of the inner ring projected from the inboard side end face of the cylindrical portion of the wheel hub. According to this feature, since the slightly displaced inner ring can be moved axially while being fastened by the nut after the constant velocity universal joint has been assembled onto the bearing apparatus and the outboard side end face abuts the shoulder portion of the wheel hub, the predetermined initial pre-load of the bearing can be maintained.

The vehicle wheel bearing apparatus comprises an outer member formed with double row outer raceway surfaces on its inner circumferential surface. An inner member includes a wheel hub and an inner ring. The wheel hub has a wheel mounting flange integrally formed at one end and a cylindrical portion axially extending from the wheel mounting flange. The cylindrical portion is formed with a serration on its inner circumferential surface. Also, one of inner raceway surfaces is on the outer circumferential surface of the cylindrical portion. The inner ring is press onto the cylindrical portion of the wheel hub. The inner ring is formed with the other of inner raceway surfaces. The double row inner raceway surfaces are arranged opposite to the double row outer raceway surfaces. Double row rolling elements are freely rollably arranged between the outer and inner raceway surfaces, respectively, of the outer and inner members, via cages. An outer joint member, forming a part of a constant velocity universal joint, is integrally formed with a shoulder portion adapted to abut the end face of the inner ring. A stem portion axially extends from the shoulder portion. The stem is adapted to insert into the wheel hub, via a serration engagement. The wheel hub and the outer joint member are removably connected to each other. An annular projection is formed on the outer circumferential surface at an inboard side end of the cylindrical portion of the wheel hub. An annular recess is formed on the inner circumferential surface at the inboard side end of the inner ring. The annular recess corresponds to the annular projection and has a difference in height slightly larger than that of the annular projection. The inner ring is press fit onto the cylindrical portion of the wheel hub with the recess engaged by the projection. An outboard side end surface of the inner ring abuts a shoulder portion on the cylindrical portion of the wheel hub. The inboard side end surface of the inner ring projects toward the inboard side from the inboard side end face of the cylindrical portion of the wheel hub.

The annular projection is formed on the outer circumferential surface at an inboard side end of the cylindrical portion of the wheel hub. An annular recess is formed on the inner circumferential surface at the inboard side end of the inner ring. The annular recess corresponds to the annular projection and has a difference in height slightly larger than that of the annular projection. The inner ring is press fit onto the cylindrical portion of the wheel hub with the recess engaged by the projection. An outboard side end surface of the inner ring abuts a shoulder portion on the cylindrical portion of the wheel hub. The inboard side end surface of the inner ring projects toward the inboard side from the inboard side end face of the cylindrical portion of the wheel hub. Thus, displacement of the inner ring that may occur during transportation of the bearing apparatus or during assembly of the bearing apparatus to the constant velocity universal joint, is stopped by the annular projection of the wheel hub. Accordingly, pinching of the inboard side seal between the inner raceway surface and the rolling element is also prevented. In addition, since the slightly displaced inner ring can be moved axially while being fastened by the nut after the constant velocity universal joint has been assembled onto the bearing apparatus and the outboard side end face abuts the shoulder portion of the wheel hub, the predetermined initial pre-load of the bearing can be maintained. Furthermore, since the inboard side end surface of the inner ring projects toward the inboard side from the inboard side end face of the cylindrical portion of the wheel hub, a sufficiently large abutting area is obtained between the inner ring and the shoulder portion of the outer joint member. Thus, wear and the generation of noise are also reduced due to a reduction of the bearing pressure between the two. Accordingly, it is possible to provide a vehicle wheel bearing apparatus that is light weight and has a small size that prevents slipping out of the inner ring from the wheel hub as well as the generation of a large hoop stress in the inner ring.

A vehicle wheel bearing apparatus comprises an outer member formed with double row outer raceway surfaces on its inner circumferential surface. An inner member includes a wheel hub and an inner ring. The wheel hub has a wheel mounting flange integrally formed at one end and a cylindrical portion axially extending from the wheel mounting flange. The cylindrical portion is formed with a serration on its inner circumferential surface. One of the inner raceway surfaces is formed on the outer circumferential surface of the cylindrical portion. The inner ring is press fit onto the cylindrical portion of the wheel hub. The inner ring is formed with the other of the inner raceway surfaces. The double row inner raceway surfaces are arranged opposite to the double row outer raceway surfaces. Double row rolling elements are freely rollably arranged between the outer and inner raceway surfaces, respectively, of the outer and inner members, via cages. An outer joint member, forming a portion of the constant velocity universal joint, is integrally formed with a shoulder portion adapted to abut the end face of the inner ring. A stem portion axially extends from the shoulder portion. The stem portion is adapted to be inserted in the wheel hub, via serration engagement. The wheel hub and the outer joint member are removably connected to each other. An annular projection is formed on the outer circumferential surface at an inboard side end of the cylindrical portion of the wheel hub. An annular recess is formed on the inner circumferential surface at the inboard side end of the inner ring. The annular recess corresponds to the annular projection and has a difference in height slightly larger than that of the annular projection. The inner ring is press fit onto the cylindrical portion of the wheel hub with the recess engaged by the projection. An outboard side end surface of the inner ring abuts a shoulder portion on the cylindrical portion of the wheel hub. The inboard side end surface of the inner ring projects toward the inboard side from the inboard side end face of the cylindrical portion of the wheel hub.

BRIEF DESCRIPTION OF THE DRAWINGS

Additional advantages and features of the present disclosure will become apparent from the subsequent description and the appended claims, taken in conjunction with the accompanying drawings, wherein:

FIG. 5 is an explanatory view showing a trouble in the prior art vehicle wheel bearing apparatus wherein FIG. 5(a) shows an initial condition where the inner ring abuts the shoulder portion of the wheel hub, FIG. 5(b) shows a condition where the inner ring is axially displaced, and FIG. 5(c) shows a condition where the inner ring is returned to its initial position.

DETAILED DESCRIPTION OF PREFERRED EMBODIMENTS

One preferred embodiment will be described with reference to the accompanying drawings.

Figure 1:
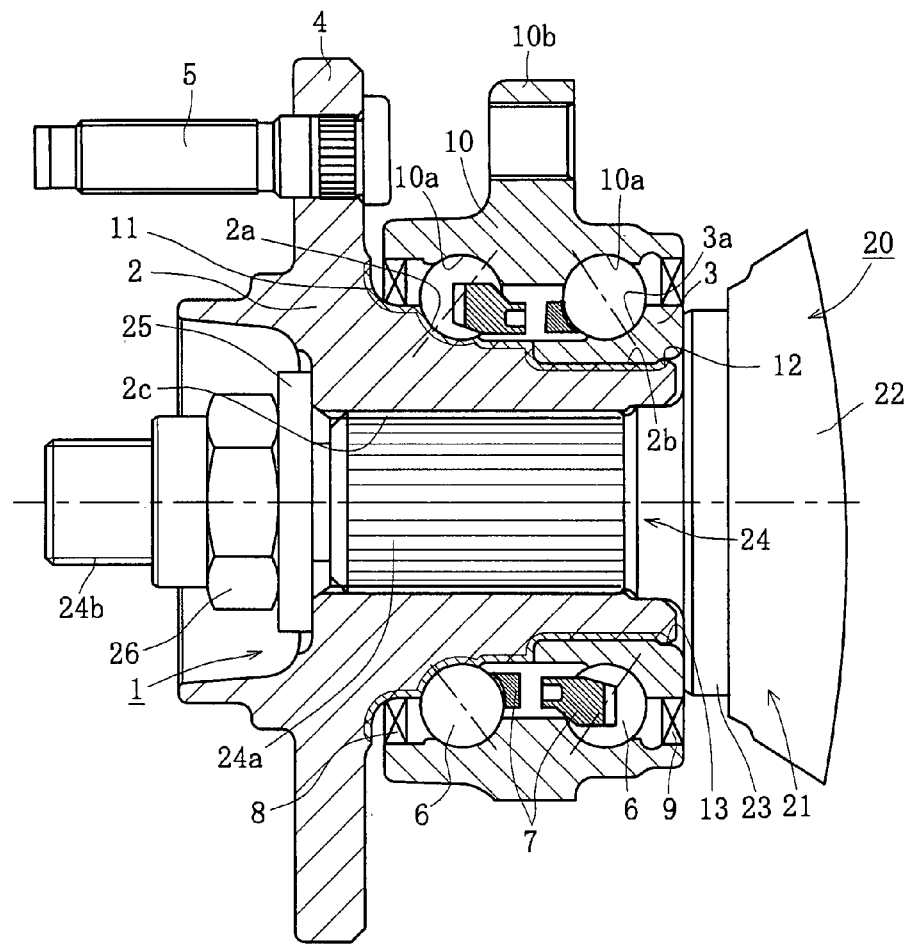
FIG. 1 is a longitudinal section view of one embodiment of a vehicle wheel bearing apparatus.
Figure 2:
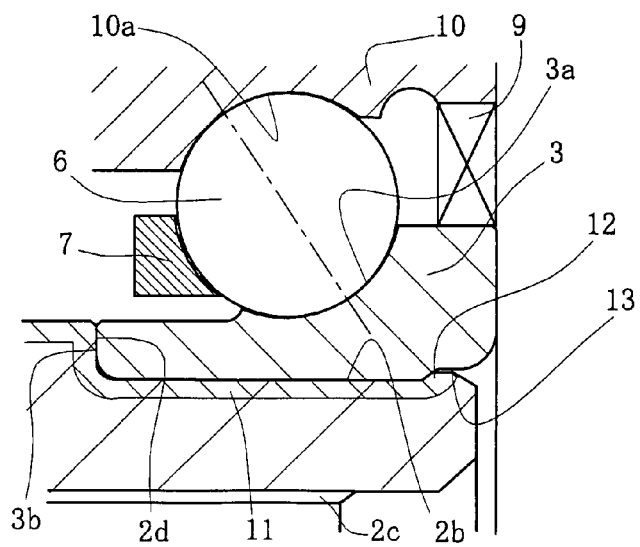
FIG. 2 is a partially enlarged section view of the vehicle wheel bearing apparatus of FIG. 1.
Figure 3:
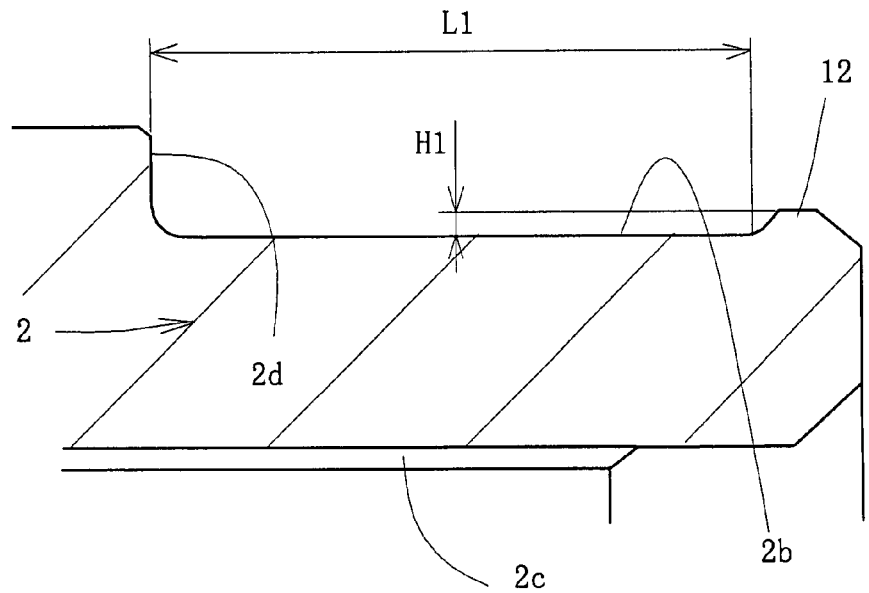
FIG. 3(a) is a partially enlarged section view of a wheel hub of the present disclosure.
FIG. 3(b) is a partially enlarged section view of an inner ring of the present disclosure.
Figure 3:
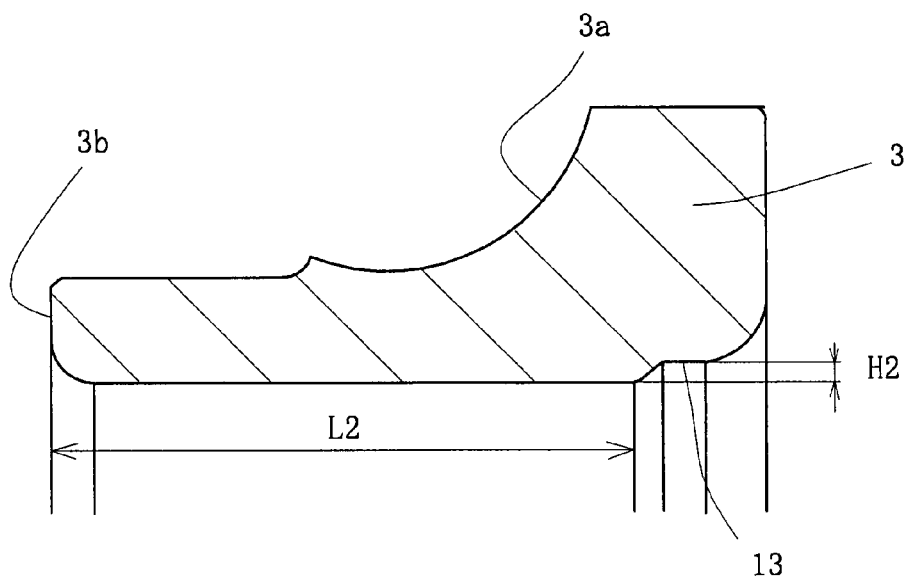
Figure 4:
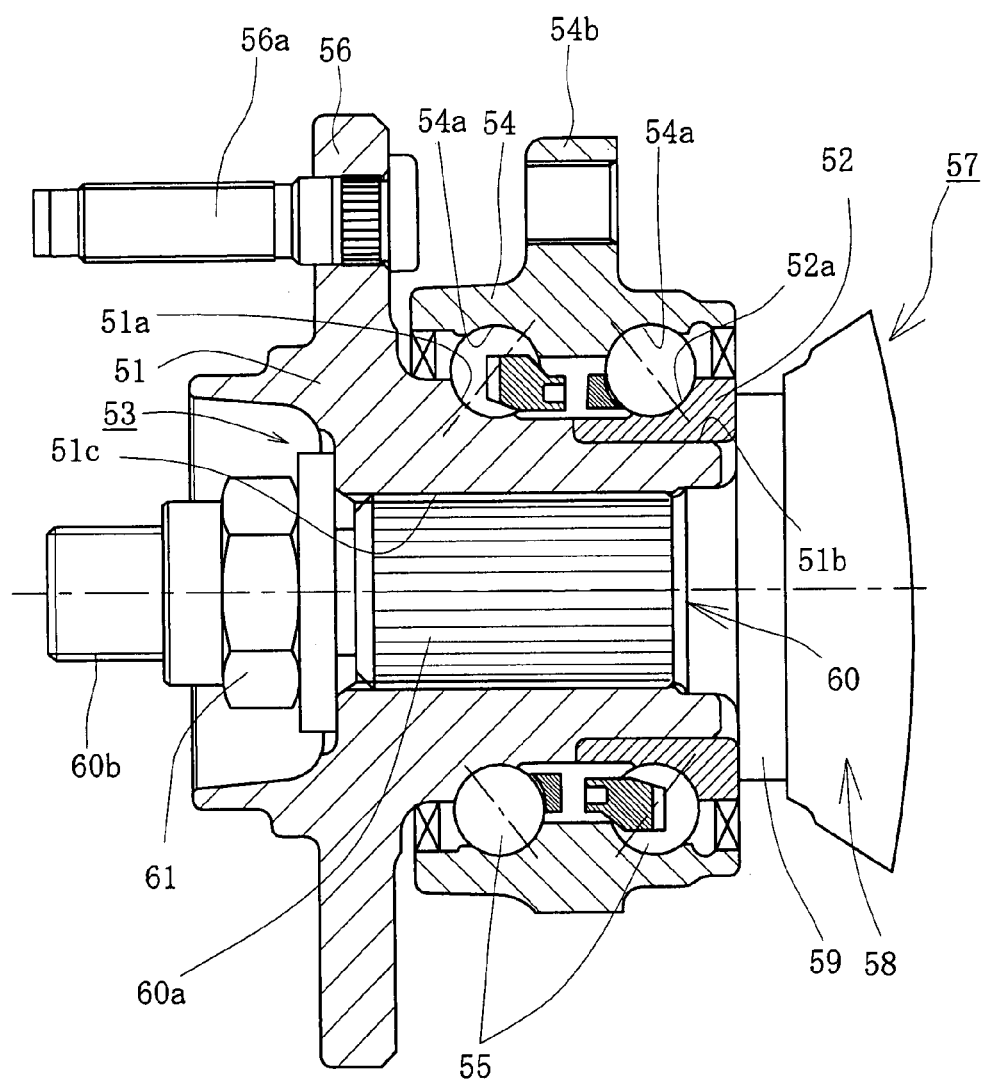
FIG. 4 is a longitudinal section view of a prior art vehicle wheel bearing apparatus.
Figure 5:
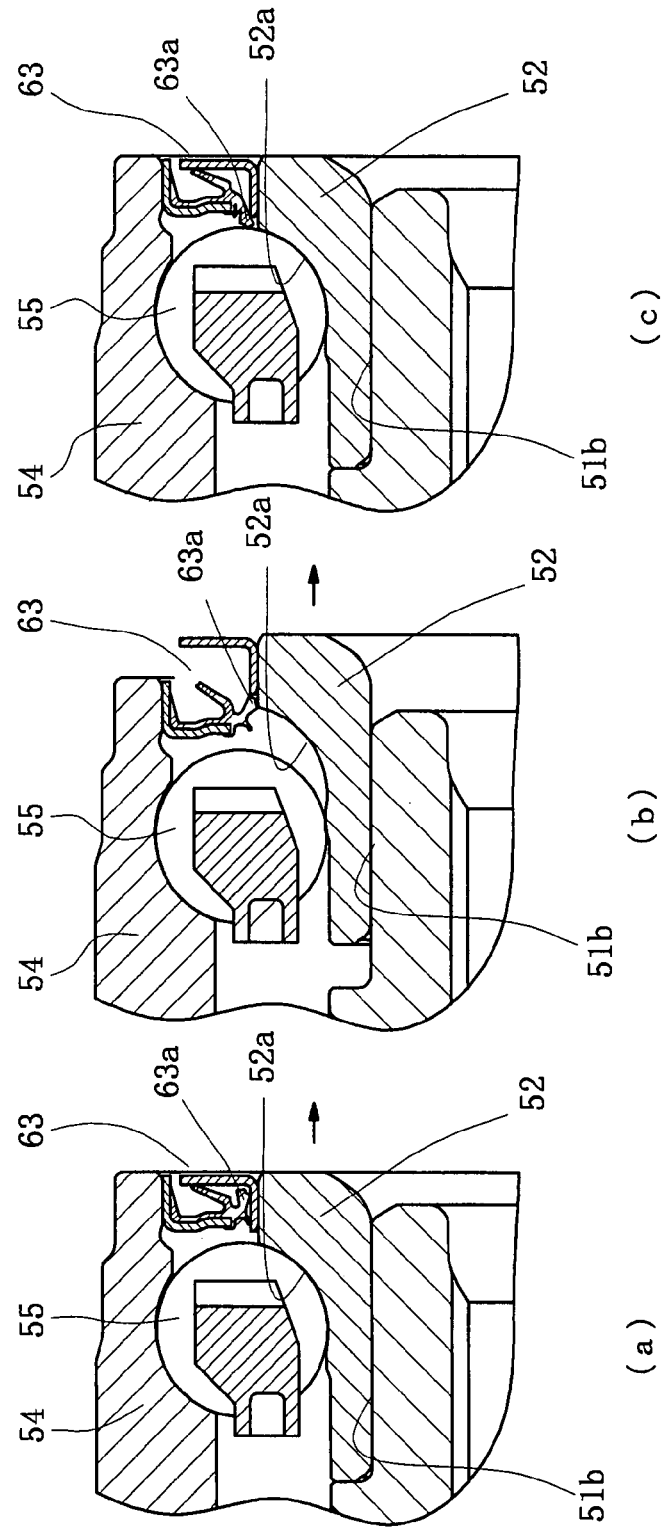
Figure 6:
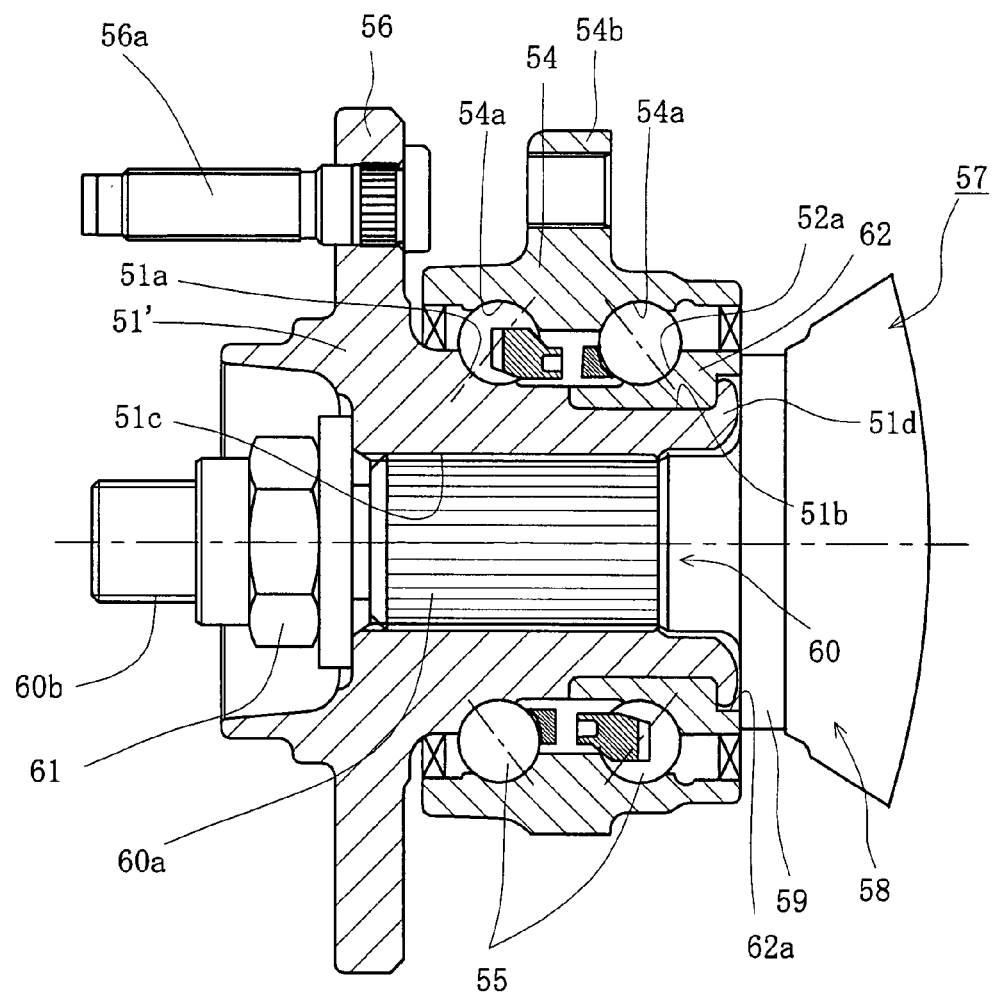
FIG. 6 is a longitudinal section view of another prior art vehicle wheel bearing apparatus.

FIG. 1 is a longitudinal section view showing an embodiment of the vehicle wheel bearing apparatus. FIG. 2 is a partially enlarged section view of the vehicle wheel bearing apparatus of FIG. 1. FIG. 3(a) is a partially enlarged section view of a wheel hub. FIG. 3(b) is a partially enlarged section view of an inner ring. In the description below, the term "outboard side" of the apparatus denotes a side that is positioned outside of the vehicle body and the term "inboard side" of the apparatus denotes a side which is positioned inside of the body when the bearing apparatus is mounted on the vehicle body.

The vehicle wheel bearing apparatus is a so-called "third generation" type used for a driving wheel side and comprises an inner member 1, an outer member 10, and a plurality of rolling elements (balls) 6 and 6 rollably arranged between the outer and inner members 1 and 10. The inner member 1 includes a wheel hub 2 and an inner ring 3 press-fit onto the wheel hub 2.

The wheel hub 2 is integrally formed, at its outboard side end, with a wheel mounting flange 4 to mount a wheel (not shown) of the vehicle. Hub bolts 5, for securing the wheel, are arranged, via an equidistant space, along the circumference of the wheel mounting flange 4. The wheel hub 2 has an inner raceway surface 2a on its outer circumferential surface. A cylindrical portion 2b axially extends from the inner raceway surface 2a. A serration (or spline) is formed on its inner circumferential surface. The inner ring 3 is formed with an inner raceway surface 3a on its outer circumferential surface. The inner ring 3 is press fit onto the cylindrical portion 2b of the wheel hub 2 via a predetermined interference.

The outer member 10 is integrally formed with a body mounting flange 10b. The outer member 10 has double row outer raceway surfaces 10a and 10a on its inner circumferential surface. Double row rolling elements 6 and 6 are freely rollably arranged between the double row outer raceway surfaces 10a, 10a and opposed inner raceway surfaces 2a, 3a. Sealing devices 8 and 9 are arranged at either ends of the outer member 10 to prevent leakage of grease contained within the bearing apparatus. Also, the seals, 8 and 9 prevent migration of rain water or dusts from the outside into the bearing apparatus.

The wheel hub 2 is made of medium carbon steel such as S53C including carbon of 0.40~0.80% by weight. The inner raceway surface 2a of the outboard side, seal land portion that contacts the outboard side sealing device 8, and the axially extending cylindrical portion 2b of the wheel hub 2 are formed with a hardened layer 11 (shown by a cross-hatching). The hardened layer 11 is hardened by high frequency induction quenching to have a surface hardness of 58~64 HRC. This not only improves the anti-friction characteristics of the seal land portion at the base of the wheel mounting flange 4 but improves the durability of the wheel hub 2 by providing a sufficient mechanical strength against the rotary bending load applied to the wheel mounting flange 4.

The inner ring 3 is made of high carbon chrome bearing steel such as SUJ 2. The inner ring 3 is hardened to its core by quenching to have a hardness of 58~64 HRC. The outer member 10 is made of medium carbon steel including carbon of 0.40~0.80% by weight, such as S53C. The double row outer raceway surfaces 10a and 10a as well as inner circumferential surface at its ends into which the sealing devices 8 and 9 are fitted are hardened by high frequency induction quenching to have a surface hardness of 54~64 HRC.

The constant velocity universal joint 20 comprises an outer joint member 21, a joint inner ring (not shown), a cage, and torque transmission balls. The outer joint member 21 has a cup-shaped mouth portion 22, a shoulder portion 23, forming a base of the mouth portion 22, and a stem portion 24 that axially extends from the shoulder portion 23. All of these elements are integrally formed as a unitary element. The stem portion 24 has a serration (spline) 24a formed on its outer circumferential surface. The stem portion serration 24a mates with the serration 2c of the wheel hub 2. An outer thread 24b is formed at the end of the stem portion 24.

The serration 24a is formed with a helix angle inclined at a predetermined angle relative to its axis. The stem portion 24 of the outer joint member 21 is inserted into the wheel hub 2 until the shoulder portion 23 abuts the end face of the inner ring 3. The helical serration 24a of the stem portion 24 is press fit into the straight serration 2c of the wheel hub. Accordingly, a desirable pre-load is applied to the mating portions of the serrations 2c and 24a. A securing nut 26 is fastened to the outer end face of the wheel hub 2, via a plate 25, with a predetermined fastening torque. Thus, the wheel hub 2 and the outer joint member 21 are axially separably connected with each other.

The base of the stem portion 24 is fit into the wheel hub 2, via a predetermined radial gap. Accordingly, the wheel hub 2 is supported on the base of the stem portion 24 via a cylindrical contact between the two. Thus, the rigidity of the wheel hub 2 can be increased. The outer joint member 21 is made of medium carbon steel including carbon of 0.40~0.80% by weight. A region from the shoulder 23 to the base of the stem 24, including truck grooves (not shown) formed in the inner circumference of the mouth portion 22, is hardened by frequency induction hardening to have a surface hardness of 58~64 HRC.

As shown in an enlarged view in FIG. 2, an annular projection 12 is formed on the outer circumferential surface at the end of the cylindrical portion 2b of the wheel hub 2. A corresponding annular recess 13, having a slightly larger difference in height than that of the projection 12, is formed on the inner circumferential surface of the inner ring 3 at its inboard side end. Accordingly, the inner ring 3 is press fit onto the cylindrical portion 2b by moving over the projection 12, by elastic deformation with the projection 12, until the smaller end face of the inner ring 3 abuts the shoulder 2d of the wheel hub 2, via a predetermined interference of 10~50 μm. Thus, the projection 12 of the wheel hub 2 engages with the recess 13 of the inner ring 3. The inner ring 3 is secured on the wheel hub 2 via an axial gap of 0~100 μm. In this case, it is designed so that the inboard side end face of the inner ring 3 projects from the end face of the cylindrical portion 2b of the wheel hub 2. That is, it is designed so that the axial gap between the recess 13 and the projection 12 is smaller than the amount of projection of the inboard side end face of the inner ring 3 projects from the end face of the cylindrical portion 2b of the wheel hub 2. In this condition, the outboard side end face of the inner ring 3 is in contact with the shoulder portion 2d of the wheel hub 2.

As shown in the enlarged view of FIG. 3(a), the annular projection 12 of the cylindrical portion 2b of the wheel hub 2 is formed by grinding. Thus, the annular recess 13 has a difference in height of (2×H1) of 60~120 μm in its diameter relative to the outer diameter of the cylindrical portion 2b on which the inner ring 3 is fitted. As shown in the enlarged view of FIG. 3(b), the annular recess 13 of the inner ring 3 is formed by grinding after hardened by quenching. Thus, the annular recess 13 has a difference in height of (2×H2) of at least 120 μm in its diameter relative to its inner diameter (H1≦H2). The difference in height (2×H2) of the recess 13 is set so that it is slightly larger than that of the projection 12. Thus, it is possible to obtain a sufficiently large area on the end face of the inner ring 3. This abutting area is between the inner ring 3 and the shoulder portion 23 of the outer joint member 21. Thus, it is also possible to reduce wear of the two and to reduce the generation of noise due to the reduction of the bearing pressure between the two. A distance L1 from the shoulder portion 2d of the wheel hub 2 to the projection 12 is set so that it is equal to or slightly larger than a distance L2. L2 is the distance from the smaller end face 3b of the inner ring 3 to the recess 13 (L1≧L2).

In this case, the projection 12 and the recess 13 are formed by grinding after the cylindrical portion 2b of the wheel hub 2 and the inner ring 3 have been hardened. Accordingly, it is possible to exactly determine their dimensions within predetermined ranges and to prevent plastic deformation of the projection 12 during the press fit of the inner ring 3. The inner ring 3 can get over the projection 12, via its elastic deformation, without causing a large hoop stress in the inner ring 3. The inner ring 3 is press fit onto the cylindrical portion 2b of the wheel hub 2.

The inner ring 3 is press fit onto the cylindrical portion 2b of the wheel hub 2 with an axially displaceable slight gap remaining between the two due to the engagement of the projection 12 and the recess 13 of the inner ring 3 after the inner ring 3 has been press fit onto the cylindrical portion 2b of the wheel hub 2. Thus, it is possible to prevent the axial displacement of the inner ring 3. Accordingly, this prevents the slipping off of the lip of the inboard side seal 9 from its sliding surface and it falling down into a space between the inner raceway surface 3a of the inner ring 3 and the rolling element 6 before transportation of the bearing apparatus or the assembly of the bearing apparatus to the constant velocity universal joint 20 at an automobile manufacturer. The constant velocity universal joint 20 is secured by fastening the nut 26 after it is assembled to the bearing apparatus. Thus, the slightly displaced inner ring 3 can be returned to its initial position. Accordingly, the pre-load of the bearing can be maintained at the initially set value. Similarly to the bearing apparatus of swing caulked type, a large hoop stress is not created in the inner ring 3. Thus, the durability of the bearing apparatus can be improved.

Other means for mounting the inner ring 3 on the wheel hub 2 with limiting axial displacement may be appreciated. For example, it may be appreciated that other means may be used such as means for forming a plurality of burrs by plastically deforming the outer end periphery of the cylindrical portion of the wheel hub, for forming a so-called staking, to axially secure the inner ring after the press fit of the inner ring formed with a recess on the cylindrical portion of the wheel hub, or means comprising the inner ring formed with an annular recess, the cylindrical portion of the wheel hub formed with an annular groove, and a snap ring adapted to be received in the annular recess and the annular groove to axially secure the inner ring relative to the cylindrical portion of the wheel hub.

The former means is difficult to make due to the size of the burrs being uniform and thus it is believed that the inner ring may slip off from the cylindrical portion of the wheel hub if the size of the burrs is too small. The burrs may exert a bad influence to the inner ring if the size of the burrs is too large. On the other hand, in the latter it means is difficult to form the recess and groove and to assemble the inner ring and the wheel hub using the snap ring. Thus, this increases the manufacturing cost of the bearing apparatus. Accordingly, it is clear that the present disclosure is superior to these means in strength, durability, reliability and manufacturing cost.

Although the bearing apparatus is shown in the drawings as a so-called third generation type where the inner raceway surface 2a is formed directly on the outer circumferential surface of the wheel hub, it will be appreciated that the present disclosure is not limited to such a third generation type and that it is applicable to the first and second generation types where a pair of inner rings are press-fit onto the axially extending cylindrical portion of the wheel hub. Also, although it is shown with the double row angular ball bearing having balls 6 and 6 as rolling elements, it may be replaced, for example, by a double row conical rolling bearing having conical rollers as the rolling elements.

The present disclosure can be applied to vehicle wheel bearing apparatus of first, second and third generations where the inner ring is press fit onto the cylindrical portion of the wheel hub.

The present disclosure has been described with reference to the preferred embodiment. Obviously, modifications and alternations will occur to those of ordinary skill in the art upon reading and understanding the above detailed description. It is intended that the present disclosure be construed as including all such alternations and modifications insofar as they come within the scope of the appended claims or their equivalents

What is claimed is:

1. A vehicle wheel bearing apparatus comprising;
an outer member formed with double row outer raceway surfaces on its inner circumferential surface;
an inner member including a wheel hub and an inner ring, said wheel hub having a wheel mounting flange integrally formed at one end and a cylindrical portion axially extending from the wheel mounting flange, a serration formed on the inner circumferential surface of the cylindrical portion and one inner raceway surface formed on the outer circumferential surface of the cylindrical portion, said inner ring being press fit onto the cylindrical portion of the wheel hub and formed with another inner raceway surface, the double row inner raceway surfaces being arranged opposite to the double row outer raceway surfaces;
double row rolling elements freely rollably arranged between the outer and inner raceway surfaces, respectively, of the outer and inner members, via cages;
an outer joint member, forming a portion of a constant velocity universal joint, integrally formed with a shoulder portion adapted to abut an end face of the inner ring and a stem portion axially extending from the shoulder portion; said stem portion adapted to be inserted in the wheel hub via serration engagement, said wheel hub and outer joint member being removably connected to each other;
a non-caulked annular projection formed on the outer circumferential surface at an inboard side end of the cylindrical portion of the wheel hub, an annular recess formed on the inner circumferential surface at the inboard side end of the inner ring, said annular recess corresponding to the annular projection and having a difference in height slightly larger than that of the annular projection, and the inner ring is press fit onto the cylindrical portion of the wheel hub passing over the annular projection into a position with the recess engaged by the projection to retain the inner ring on the wheel hub, an outboard side end surface of the inner ring abutting a shoulder portion on the cylindrical portion of the wheel hub, and the inboard side end surface of the inner ring projecting toward the inboard side from the inboard side end face of the cylindrical portion of the wheel hub.

2. A vehicle wheel bearing apparatus of claim 1 wherein the wheel hub is made of medium carbon steel including carbon of 0.40~0.80% by weight, said one of said inner raceway surfaces is directly formed on its outer circumferential surface, an area ranging from the inner raceway surface to the cylindrical portion is hardened by high frequency induction hardening to have a surface hardness of 58~64 HRC, the inner ring is made of high carbon chrome bearing steel and hardened to its core by dip quenching to have a surface hardness of 58~64 HRC, and the annular projection and the annular recess are formed by a cutting process.

3. A vehicle wheel bearing apparatus of claim 2 wherein the inner ring is press fit onto the cylindrical portion of the wheel hub via an interference of 10~50 μm, and the annular projection is formed to have a difference in height of 60~120 μm in its diameter relative to the outer circumferential surface of the cylindrical portion of the wheel hub.

4. A vehicle bearing apparatus of claim 2 wherein the stem portion of the outer joint member is fit into the inner circumferential surface of the wheel hub via a predetermined radial gap.

5. A vehicle bearing apparatus of claim 2 wherein an axial gap is formed between the annular projection and the annular recess in a condition where the outboard side end face of the inner ring abuts the shoulder portion on the cylindrical portion of the wheel hub, the axial gap is set to be less than an amount of the projection of the inboard side end face of the inner ring projected from the inboard side end face of the cylindrical portion of the wheel hub.

6. A vehicle wheel bearing apparatus of claim 1 wherein the inner ring is press fit onto the cylindrical portion of the wheel hub via an interference of 10~50 μm, and the annular projection is formed to have a difference in height of 60~120 μm in its diameter relative to the outer circumferential surface of the cylindrical portion of the wheel hub.

7. A vehicle bearing apparatus of claim 6 wherein an axial gap is formed between the annular projection and the annular recess in a condition where the outboard side end face of the inner ring abuts the shoulder portion on the cylindrical portion of the wheel hub, the axial gap is set to be less than an amount of the projection of the inboard side end face of the inner ring projected from the inboard side end face of the cylindrical portion of the wheel hub.

8. A vehicle bearing apparatus of claim 6 wherein the stem portion of the outer joint member is fit into the inner circumferential surface of the wheel hub via a predetermined radial gap.

9. A vehicle bearing apparatus of claim 1 wherein the stem portion of the outer joint member is fit into the inner circumferential surface of the wheel hub via a predetermined radial gap.

10. A vehicle bearing apparatus of claim 9 wherein an axial gap is formed between the annular projection and the annular recess in a condition where the outboard side end face of the inner ring abuts the shoulder portion on the cylindrical portion of the wheel hub, the axial gap is set to be less than an amount of the projection of the inboard side end face of the inner ring projected from the inboard side end face of the cylindrical portion of the wheel hub.

11. A vehicle bearing apparatus of claim 1 wherein an axial gap is formed between the annular projection and the annular recess in a condition where the outboard side end face of the inner ring abuts the shoulder portion on the cylindrical portion of the wheel hub, the axial gap is set to be less than an amount of the projection of the inboard side end face of the inner ring projected from the inboard side end face of the cylindrical portion of the wheel hub.

* * * * *

UNITED STATES PATENT AND TRADEMARK OFFICE
CERTIFICATE OF CORRECTION

PATENT NO. : 7,866,893 B2
APPLICATION NO. : 11/792012
DATED : January 11, 2011
INVENTOR(S) : Hisashi Ohtsuki It is certified that error appears in the above-identified patent and that said Letters Patent is hereby corrected as shown below:

Column 1
Line 57 "51 a" should be --51$a$--

Signed and Sealed this
Twenty-first Day of June, 2011

David J. Kappos
*Director of the United States Patent and Trademark Office*